(12) United States Patent
Donoho

(10) Patent No.: US 7,941,977 B2
(45) Date of Patent: *May 17, 2011

(54) UNITARY CONFIGURED BIRD REPELLENT APPARATUS

(75) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,840

(22) Filed: Jul. 28, 2009

(65) Prior Publication Data

US 2010/0013123 A1 Jan. 21, 2010

Related U.S. Application Data

(63) Continuation of application No. 09/317,303, filed on May 24, 1999, now Pat. No. 7,596,910.

(51) Int. Cl.
*E04B 1/72* (2006.01)
(52) U.S. Cl. .............................. 52/101; 264/328.1; 43/1
(58) Field of Classification Search ................... 43/1
See application file for complete search history.

(56) References Cited

U.S. PATENT DOCUMENTS

| 2,258,803 | A | 10/1941 | Peles |
| 2,475,047 | A | 7/1949 | Peles |
| 2,777,171 | A | 1/1957 | Burnside |
| 2,887,730 | A | 1/1959 | Bittner |
| 2,888,716 | A | 6/1959 | Kaufman |
| 2,938,243 | A | 5/1960 | Peles |
| 3,191,239 | A | 6/1965 | Moore |
| 3,282,000 | A | 11/1966 | Shaw |
| 3,407,550 | A | 10/1968 | Shaw |
| 5,253,444 | A | 10/1993 | Donoho et al. |
| 5,339,555 | A | 8/1994 | Miskimins |
| 5,400,552 | A | 3/1995 | Negre |
| 5,433,029 | A | 7/1995 | Donoho et al. |
| 7,243,465 | B2 * | 7/2007 | Donoho .......................... 52/101 |
| 7,596,910 | B1 * | 10/2009 | Donoho .......................... 52/101 |
| 2005/0160685 | A1 * | 7/2005 | Donoho .......................... 52/101 |
| 2007/0180781 | A1 * | 8/2007 | Donoho .......................... 52/101 |
| 2009/0249710 | A1 * | 10/2009 | Donoho .......................... 52/101 |
| 2010/0013123 | A1 * | 1/2010 | Donoho ...................... 264/328.1 |

FOREIGN PATENT DOCUMENTS

| EP | 300936 | | 1/1989 |
| EP | 300936 A1 * | | 1/1989 |
| FR | 2693080 | | 1/1994 |
| FR | 2730383 | | 8/1996 |
| GB | 2153644 | | 8/1985 |
| GB | 2344269 | | 6/2000 |
| GB | 2344269 A * | | 6/2000 |

* cited by examiner

OTHER PUBLICATIONS

Dictionary.com Unabridged (v1.1): "Rail". FactMonster.com Encyclopedia: Cross; Cross-shapes.

*Primary Examiner* — Francis T Palo
(74) *Attorney, Agent, or Firm* — Fish & Associates, PC

(57) ABSTRACT

A bird repellent apparatus having an integral base member and a plurality of prongs. The base member, by means of a plurality of tabs having holes for receiving screws or other fasteners, can be affixed to virtually any desired surface. The plurality of prongs with sharp tips presents an impossible barrier to birds that would otherwise land or perch on the surface to which the present invention is affixed. The combined base member and prongs are formed from injection molded plastic structure that also provide the tabs having holes to secure the base member to the underlying surface.

20 Claims, 3 Drawing Sheets

UNITARY CONFIGURED BIRD REPELLENT APPARATUS

CROSS-REFERENCE TO RELATED APPLICATIONS

This application is a continuation of U.S. application Ser. No. 09/317,303 filed May 24, 1999, now issued as U.S. Pat. No. 7,596,910. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates generally to devices for preventing birds from landing or perching on selected surfaces, and more specifically to a bird repellent apparatus that comprises a base member and integral prongs preferably made out of injection molded plastic for simple and low cost manufacture and easy installation on virtually any surface to which access to birds is to be denied.

BACKGROUND OF THE INVENTION

Prior Art

The presence of birds on window sills, roof tops, boat masts and covers and the like is often undesirable. Bird droppings attract insects and provide a fertile bed for bacteria which can present a significant health hazard. Additionally, the unaesthetic appearance of bird droppings and the like often requires the task of unpleasant and time consuming clean up where access to the droppings is available. Often times the repulsive appearance of bird droppings and other by-products of birds is not even accessible for clean up.

The use of a plurality of pointed objects, such as spikes and the like, mounted on surfaces where it is desired to repel birds is not unknown. However, heretofore the typical bird repellent apparatus comprises a metal base having a plurality of angularly and upwardly projecting metal wires or spikes. Unfortunately, such metal contraptions, while accomplishing the desired result, tend to be costly to manufacture because they are not conductive to non-labor intensive manufacturing processes such as injection molding for example. Perhaps most importantly, they tend to be relatively expensive, which inherently limit their use.

There is a need therefore for a bird repellent apparatus which is easy and less costly to manufacture and which is relatively inexpensive to the user, thereby facilitating its use in larger numbers for avoiding the aforementioned problems of insect and bacteria infestation and unaesthetic appearance of the droppings and other waste products birds leave in their wake.

Until the issuance of the applicant's prior patent, namely U.S. Pat. No. 5,253,444, the typical bird repellent apparatus comprised a metal base having a plurality of angularly and upwardly projecting metal wires or spikes. Unfortunately, such metal contraptions, while accomplishing the desired result, tend to be costly to manufacture because they are not conducive to non-labor intensive manufacturing processes such as injection molding for example. Most importantly, they tend to be relatively expensive, which inherently limits their use. The disadvantages of such prior art was addressed in the applicant's prior disclosure in the aforementioned patent, relating to a bird repellent apparatus comprising a base member and a plurality of top members, each of which holds a plurality of prongs. All of the components of the applicant's prior invention can preferably be made of an injection molded plastic which can be cheaply manufactured in large numbers with virtually no significant labor costs. The use of injection molded plastics not only reduces the cost of manufacture and thus the cost to the user, but also provides the opportunity to manufacture the product in a variety of different colors, some of which may be selected to blend in with the color of the underlying surface and some of which may be purposely selected to provide an aesthetically pleasing and distinctive appearance. In any case, the applicant's prior invention provides an efficient, effective apparatus for repelling birds from surfaces, such as window sills, roof tops, boat masts, boat covers and the like, while overcoming the disadvantages of the prior art devices. However, the need for separate base members, top members and prongs, makes for a more costly apparatus because of the need for separate manufacture of the various components and assembly of such components. Moreover, that prior art configuration is inherently more difficult to install and is inherently less durable because of having a plurality of separate components. Thus, there is a continuing need for a unitary apparatus which is easier to manufacture and install and which is more durable and lower in cost.

SUMMARY OF THE INVENTION

The aforementioned need is satisfied by the present invention which provides significant advantages over the aforementioned prior art. More specifically, the present invention comprises a bird repellent apparatus having an integral base member and a plurality of prongs preferably made of an injection molded plastic which can be cheaply manufactured in large numbers with virtually no significant labor costs. The base member, by means of a plurality of tabs having holes for receiving screws or other fasteners, can be affixed to virtually any desired surface. The plurality of prongs with sharp tips presents an impossible barrier to birds that would otherwise land or perch on the surface to which the present invention is affixed. The use of a unitary, integral injection molded plastic structure, not only reduces the manufacture cost and thus the cost to the user, but also provides the opportunity to manufacture the product in a variety of different colors, some of which may be selected to blend in with the color of the underlying surface and some of which may be purposely selected to provide an aesthetically pleasing and distinctive appearance. In either case, it can be seen that the present invention provides an efficient and effective apparatus for repelling birds from surfaces such as window sills, roof tops, boat masts and boat cover and the like, while overcoming the previously described disadvantages of the prior art.

OBJECTS OF THE INVENTION

It is therefore a principal object of the present invention to provide a bird repellent apparatus for installation on selected surfaces for preventing birds from landing or perching thereon and which overcomes the disadvantages of the prior art.

It is an additional object of the present invention to provide a bird repellent apparatus made entirely of low cost plastic.

It is still an additional object of the present invention to provide a bird repellent apparatus of the type having a plurality of sharp-tipped prongs to prevent birds from landing or perching upon selected surfaces, the apparatus having an integral base member.

It is still an additional object of the present invention to provide a bird repellent apparatus comprising an injection molded or extruded plastic base member and a plurality of sharp-tipped prongs, the base member and prongs all being integrally formed to provide a unitary structure.

It is yet an additional object of the invention to provide a unitary plastic bird repellent apparatus having installation enhancement features including break point grooves for easy cutting, a glue trough for adhering the apparatus to hard surfaces and molded screw holes for attachment to wood surfaces and the like.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which.

DETAILED DESCRIPTION OF A PREFERRED EMBODIMENT

Figure 1:
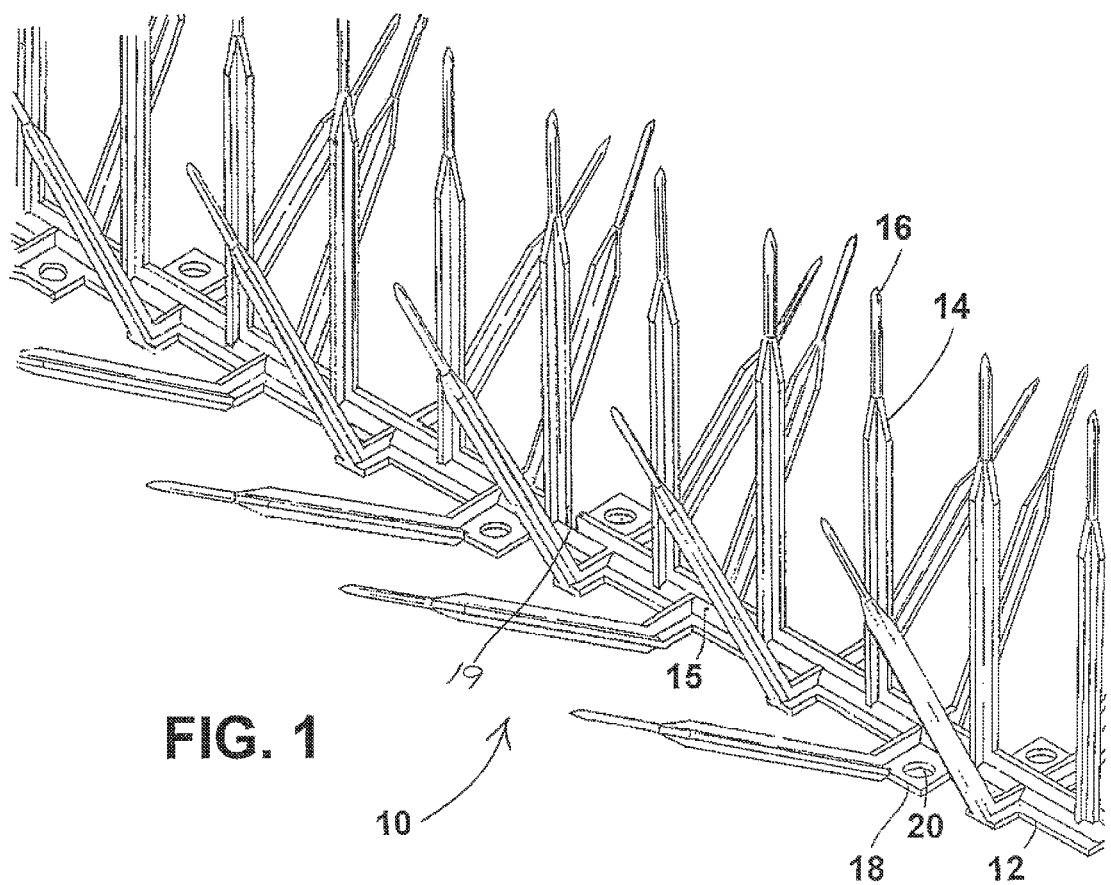
FIG. 1 is a three-dimensional illustration of the present invention shown ready for installation on an exterior window sill adjacent a window frame or other suitable surface.
Figure 2:
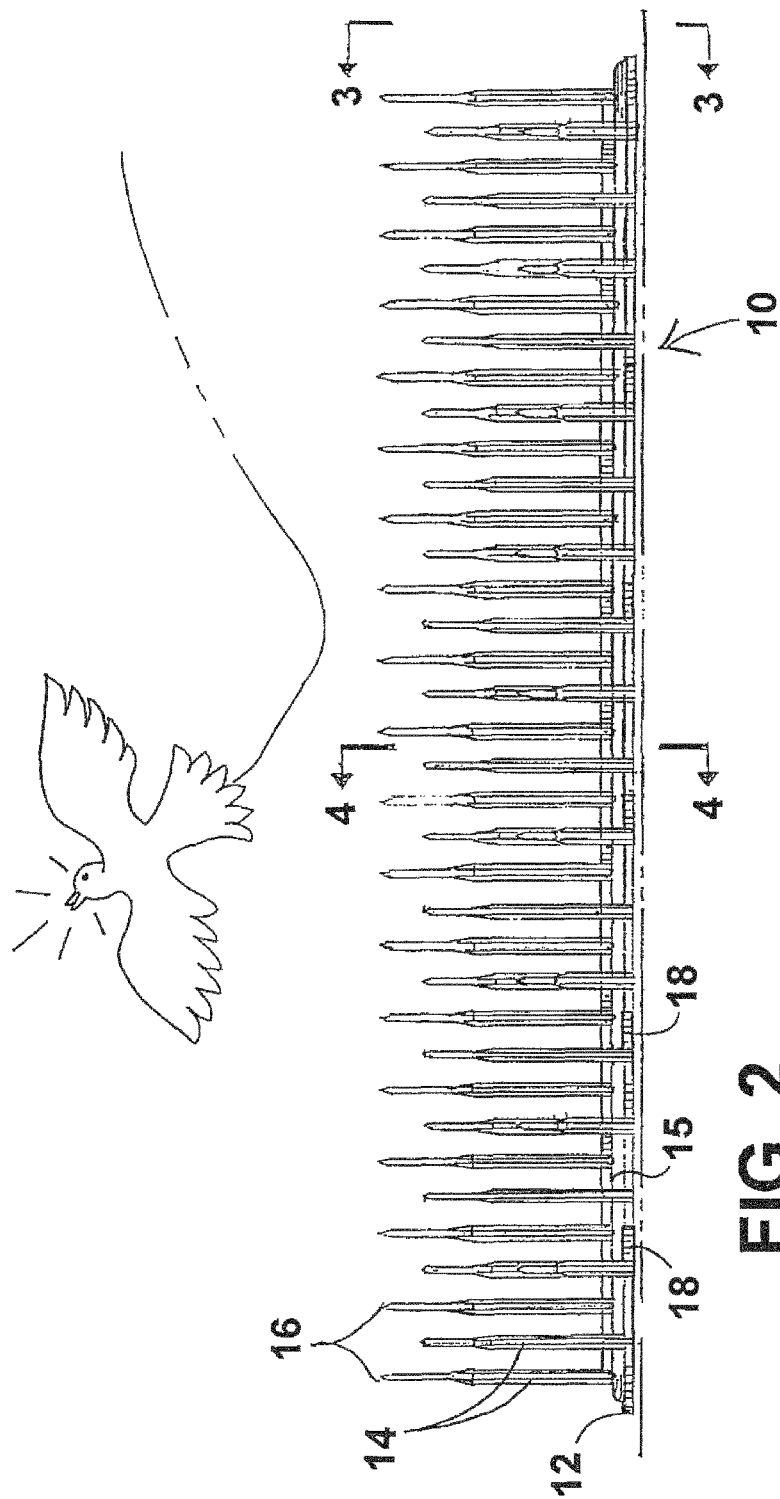
FIG. 2 is a plan view of the present invention.

Referring to FIGS. 1 and 2, it will be seen that the bird repellent apparatus 10 of the present invention comprises a base member 12 and a plurality of prongs 14. Each such prong terminates in a sharp tip 16. The base member 12 provides a rail 15 from which extends integrally therefrom the prongs 14 along the full length of base member 12. A plurality of flanges 18 each has a hole 20 and extends in opposed directions away from the rail 15. Each hole 20 is adapted to receive a screw for connecting the base member 12 to an underlying surface such as a window sill. A notch 19 provides a convenient cutting line at various locations along the base member 12 to permit length selection at the installation site.

Figure 3:
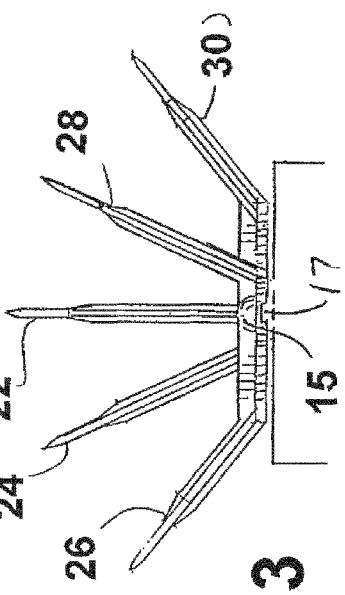
FIG. 3 is a side view of the present invention.
Figure 4:
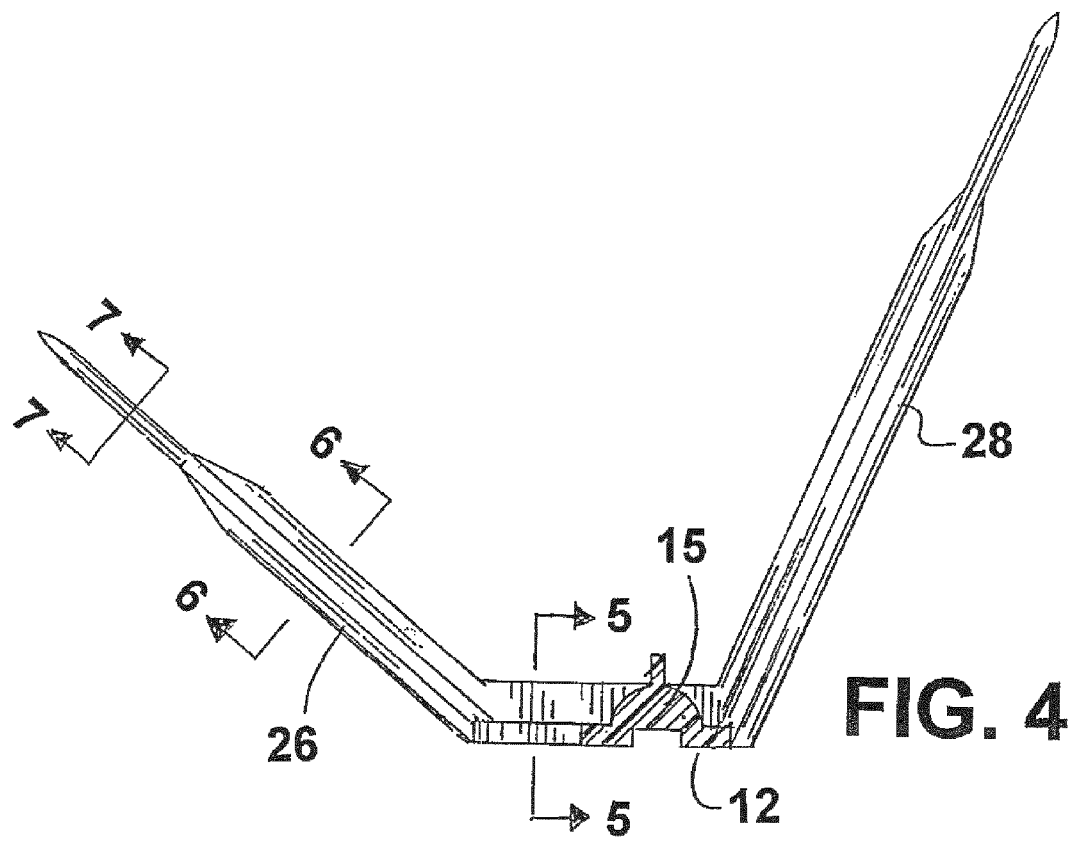
FIG. 4 is a cross-sectional view of the invention taken along lines 4-4 of FIG. 2.

The prongs 14 are provided at various angles relative to the underlying surface. As shown best in FIG. 3, prongs 22 are oriented at 90 degrees relative to the underlying surface, prongs 26 and 30 are oriented at about 30 degrees above the underlying surface and prongs 24 and 28 are oriented at about 70 degrees above the underlying surface. Moreover, prongs 26 and 30 are on opposed sides of the rail 15 as are prongs 24 and 28. As shown in FIGS. 1 and 2, this orientation of the prongs forms a repetitive pattern along the length of base member 12. As shown best in FIG. 3, a glue trough 17 permits neat glue application for installation on hard surfaces such as concrete brick and steel.

Figure 5:
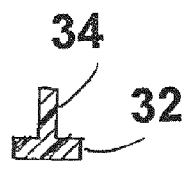
FIGS. 5, 6 and 7 are cross-sectional views of various elements of the invention taken along lines 5-5, 6-6 and 7-7 of FIG. 4.
Figure 6:
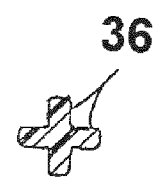
Figure 7:

As shown in FIGS. 4-7, the cross-section of the prongs where they connect to rail 15 is "T"-shaped as shown in FIG. 5. The cross-section of the prongs along their major length is cross-shaped as shown in FIG. 6 and the cross-section of the prongs close to their pointed ends 16 is circular as shown in FIG. 7.

A key feature of the present invention is the unitary structure of the entire bird repellent apparatus shown in FIGS. 1 and 2. This feature permits the disclosed embodiment to be fabricated as a single injection-molded plastic member obviating any further assembly before installation on an underlying surface. This unique unitary design reduces fabrication costs and simplifies installation as well.

Having thus disclosed an exemplary embodiment, it being understood that other configurations are contemplated as being within the scope hereof, what is claimed is:

The invention claimed is:

1. A method of forming a bird deterrent, comprising: injection molding as a single continuous piece, a length of elongated base member from which extend a plurality of laterally extended prongs alternating with intermediate prongs.

2. The method of claim 1, further comprising molding the piece such that the laterally extending prongs are paired, with one member of a pair angled differently with respect to the base member than the other member of the pair.

3. The method of claim 1, further comprising molding the piece such that the laterally extending prongs alternate on each side of the base member between a lower-angled prong and an upper-angled prong.

4. The method of claim 1, further comprising molding the piece such that at least one of the laterally extending prongs extends laterally at about 30 degrees relative to the base member.

5. The method of claim 1, further comprising molding the piece such that at least one of the laterally extending prongs extends laterally at about 70 degrees relative to the base member.

6. The method of claim 1, further comprising molding the piece such that angles of the lower-angled prong and the upper-angled prong relative to the base member differ by about 40 degrees.

7. The method of claim 1, further comprising molding the piece such that a plurality of spaced flanges extending horizontally from the base member.

8. The method of claim 7, further comprising molding the piece such that each of the flanges is continuous with one of the plurality of laterally extending prongs.

9. The method of claim 1, further comprising molding the piece such that first and second members of each of the plurality of pairs of laterally extending prongs extend indirectly from the base member, via laterally projecting arms.

10. The method of claim 1, further comprising molding the piece such that first and second members of each of the plurality of pairs of laterally extending prongs include at least some portion having a round cross-sectional area.

11. The method of claim 1, further comprising molding the piece such that first and second members of each of the plurality of pairs of laterally extending prongs include at least some portion having a cross-shaped cross-section.

12. The method of claim 1, further comprising molding the piece such that each of the laterally extending prongs terminates in a sharp tip.

13. The method of claim 1, further comprising molding the piece such that the base member has a flat bottom surface.

14. The method of claim 1, further comprising molding the piece such that the base member has a flat bottom surface and a longitudinal trough.

15. The method of claim 1, further comprising molding the piece such that the base member has a ridge.

16. The method of claim 1, further comprising molding the piece such that each of the intermediate prongs includes a first portion having a round cross-sectional area and a second portion having a round cross-sectional area.

17. The method of claim 1, further comprising molding the piece such that the laterally and upwardly extending prongs appear as five fanned projections from an end view of the deterrent.

18. The method of claim 1, further comprising molding the piece such that the intermediate prongs extend normally from the base member.

19. The method of claim 1, further comprising molding the piece such that the intermediate prongs extend normally from a ridge running along an upper surface of the base member.

20. The method of claim 1, further comprising molding the piece such that the base member includes a plurality of spaced cutting notches.

* * * * *